United States Patent Office

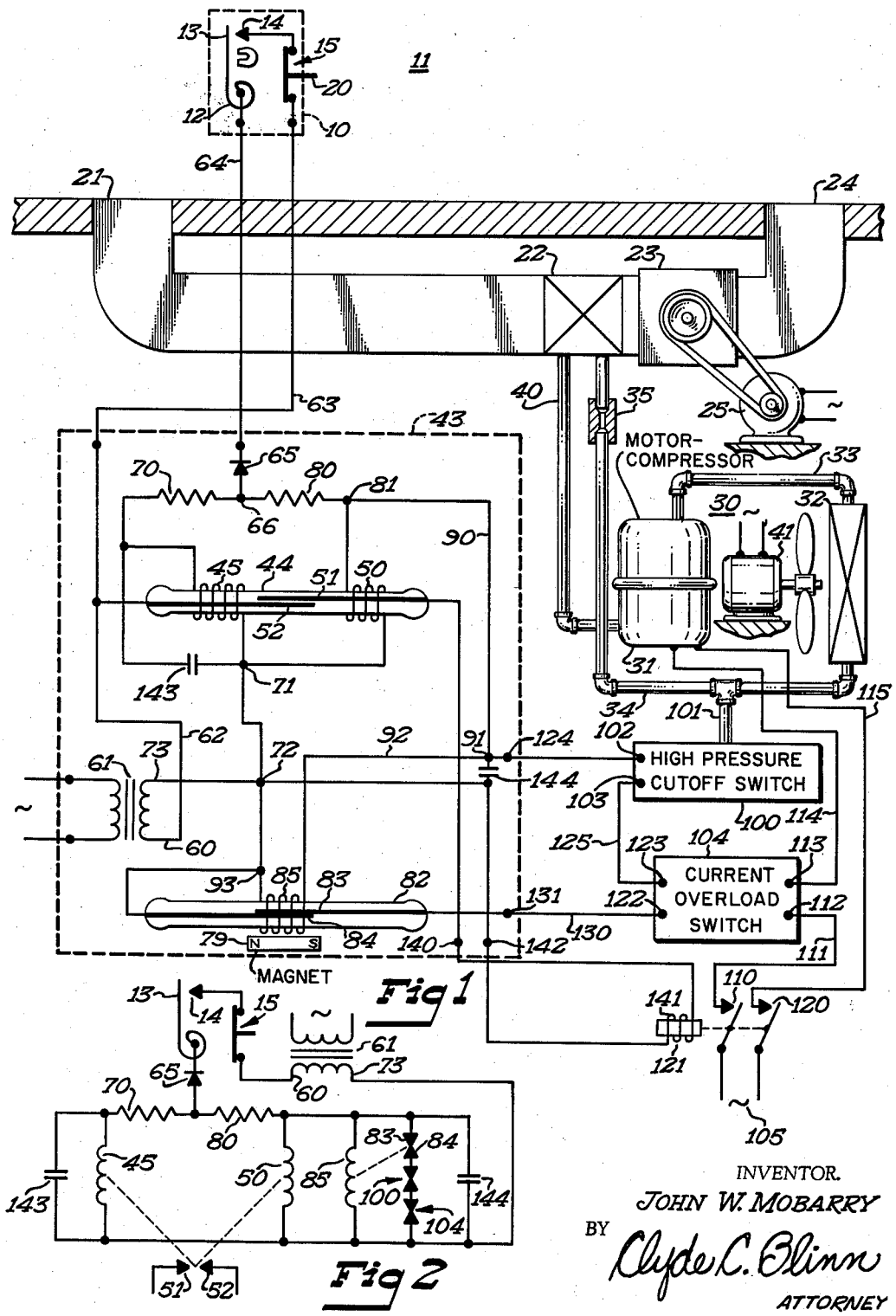

3,100,972
Patented Aug. 20, 1963

3,100,972
CONTROL APPARATUS
John W. Mobarry, Minneapolis, Minn., assignor to Minneapolis-Honeywell Regulator Company, Minneapolis, Minn., a corporation of Delaware
Filed Mar. 14, 1962, Ser. No. 179,693
5 Claims. (Cl. 62—161)

The present invention is concerned with an improved remote reset circuit for use with air conditioning apparatus; in particular, a reset circuit has a reed relay which is controlled by two windings so that a switch is normally controlled by the relay when one winding is energized and is opened when a second winding is energized. The second winding is controlled by a shunt circuit made up of abnormal condition switch devices so the presence of an abnormal condition will render the first switch open to be only placed back in normal operation by a de-energization of the complete circuit.

In recent years with the advent of residential air conditioning in a more common degree, more refined control systems are constantly being designed. One of the features of these control systems is the use of a remote resetting feature where an abnormal condition responsive shut down switch can be reset to place the system back in operation from a remote position such as at the thermostat in the living quarters of the dwelling. As a result of the constant work to make a better and less expensive control circuit, the art has been fairly well developed.

The present invention is concerned with a specific circuit which makes use of a reed relay connected in a control system for a refrigeration apparatus. Since a reed relay switch which is normally open can be controlled by two windings, one winding is used for the normal control of the switch and a second is used to open the switch upon the presence of an abnormal operating condition. By means of a holding relay, the second energization winding is maintained energized even after the abnormal condition is removed so a complete restoration to normal operation can only be accomplished by removing power from the circuit at the space thermostat.

An object of the present invention is to provide an improved remote reset circuit having a relay with a pair of energization windings one of which is used to render the relay inoperative when a circuit associated with that winding is activated.

Another object of the present invention is to provide a simple and inexpensive remote reset circuit applicable to reed relay where two windings are used to control the switch and a shunt circuit for one of the windings is made up of a relay winding having a shorting circuit comprising a normally closed switch of the relay and abnormal condition responsive switches which open upon the presence of an abnormal condition.

These and other objects of the present invention will become apparent upon the study of the following specification and drawing of which:

FIGURE 1 is a circuit representation of the air conditioning control system and the remote resetting circuit.

FIGURE 2 is a schematic circuit of the circuit shown in FIGURE 1.

A conventional thermostat 10 is located in a space 11 in which the temperature is being controlled. The thermostat comprises a bimetal 12 which moves a member 13 to engage a contact 14 when the temperature of the space increases above a predetermined value depending upon the control point setting of the thermostat. Contained in the thermostat is a switch 15 for opening the thermostat circuit when a manual button 20 is pushed.

Cool air is delivered to space 11 from a duct 21 after the air flows through a heat exchanger or cooling coil 22 under the power of a fan 23 after being drawn from space 11 through a return duct 24. Fan 23 is driven at a constant speed by a conventional motor 25. Coil or heat exchanger 22 is connected into a conventional refrigeration system 30. The refrigeration system comprises a motor compressor 21 which is connected to a heat exchanger or condenser 32 in a conventional manner as follows: from the motor compressor, a pipe 33, condenser 32, a pipe 34, a conventional restriction 35, coil 22, a pipe 40, and back to the motor compressor. Air is blown through the condenser coil by a fan driven by motor 41. Upon the energization of the motor compressor, refrigerant is delivered to coil 22 to reduce the temperature of the coil and cool the air which is circulated through the system from space 11.

A control panel 43 is used to interconnect thermostat 10 to the refrigeration system 30. Panel 43 comprises a conventional reed relay 44 which has two energization windings 45 and 50 wound thereon. The reed relay is of the type shown in the Bascom Patent 2,203,321 which has a pair of ferromagnetic members sealed in a glass tube so that upon the energization of a winding closely associated with the members, a magnetic field exists to magnetize the two members. The adjacent ends of the two members are attracted to each other to close the gap between the members and the electrical circuit connected to the members or switch. By the arrangement of the magnetic field, different types of operation can be obtained with such reed relays. In relay 44, the energization of winding 45 causes members 51 and 52 to engage each other to close the switch and the energization of winding 50 simultaneously with winding 45 to counteract the flux of winding 50 results in the parting of members 51 and 52 to open the switch. Relay 44 is connected to a source of power by a circuit traced as follows: from a terminal 60 of the secondary winding of a transformer 61, conductor 62, conductor 63, thermostat 10 which includes the series connection of switch 15, and the switch formed by movable member 13 and contact 14, conductor 64, a unidirectional current conducting device or diode 65, a resistance 70, winding 45, terminal 71, terminal 72 and back to the other terminal 73 of the secondary winding. Connected in parallel with winding 45 is a second circuit traced as follows: from terminal 66, a resistance 80, a terminal 81, winding 50 and back to terminal 71. Resistance 80 provides a current limiting means to prevent energization of winding 50 when the shunt circuit is established. Resistance 70 is to balance the current level so windings 45 and 50 have the same magnetic flux output to affect the cancellation needed to open the circuit of members 51 and 52. A second reed relay 82 comprises members 83 and 84 which are normally held together due to the effect of a bias magnet 79, but upon the energization of a winding 85 which has a magnet flux to oppose the flux of magnet 79, the members separate. Winding 85 is connected in parallel with winding 50 by a circuit traced as follows: from terminal 81, a conductor 90, terminal 91, a conductor 92, winding 85, terminal 93, and back to terminal 72.

Associated with the refrigeration apparatus is two abnormal operating condition responsive switches. A conventional high pressure cut-out switch 100 such as shown in the Kronmiller Patent 2,377,503 is connected to pipe 34 by a pipe 101. Upon the presence of a high pressure in the refrigeration system, an open circuit exists between the terminals 102 and 103. A conventional current overload switch 104 is connected in the energization circuit of the motor compressor by a circuit traced as follows: from a source of power 105, switch 110, conductor 111, terminal 112, terminal 113, a conductor 114, motor compressor 31, a conductor 115, switch 120 and back to the source of power 105. Upon the energization of relay 121, switches 110 and 120 close to energize the motor compressor. Upon the presence of that excessive current passing through switch 104, an open circuit exists between terminals 122 and 123 to de-energize the compressor motor. A low resistance circuit is used to shunt the energization windings 50 and 85. The low resistance circuit can be traced as follows: from terminal 91, terminal 124, terminals 102 and 103 of switch 100, conductor 125, terminals 123 and 122 of switch 104, conductor 130, terminal 131, the switch formed by members 83 and 84, terminal 93, and terminal 72.

The switch formed by members 51 and 52 is connected to control relay 121 by a circuit traced as follows: from terminal 60 of the transformer secondary, conductor 62, member 52, member 51, terminal 140, winding 141, terminal 142 and back to the other terminal 72 of the secondary winding. Connected in parallel with winding 45 is a condenser 143 and connected in parallel with the low resistance circuit as well as windings 85 and 50 is a second condenser 144. These condensers provide for filtering at the pulsing voltage across coils 45, 50 and 85.

*Operation*

By referring to the schematic shown in FIGURES 1 and 2, the operation of the invention will be described. Since the same numbers for the various components of the circuit have been carried from FIGURE 1 to FIGURE 2, a reference to any particular component is the same for either FIGURE 1 or FIGURE 2.

With a conventional A.C. source of power supplied to the transformer 61 and the source 105 as well as motors 25 and 41, the system is placed in operation. Upon a call for cooling by a drop in the space temperature, the switch of the thermostat closes when member 13 engages contact 14. The energization circuit for reed relay 44 is completed to energize winding 45 and close the switch formed by members 51 and 52. Relay 121 is then energized to close the energization circuit to motor compressor 31. Upon a subsequent satisfaction in the space temperature to cause thermostat 10 to open the switch formed by movable member 13 and contact 14, a reverse in the operation will take place and the motor compressor will be de-energized. Resistor 70 is placed in the circuit to balance the current supply to winding 45. Resistor 80 connected in the circuit of winding 50 is selected to balance the current to winding 50. With the abnormal condition switches 100 and 104 closed, a low resistance circuit exists to shunt winding 50. The voltage drop across the low resistance circuit is so small due to the effect of the impedance 80 that the output of winding 50 has no effect upon relay 44. By the same token, switch 82 remains closed as the current in winding 85 is ineffective to bring members 83 and 84 together.

Upon the presence of an abnormal operating condition such as an excessive current being delivered to motor compressor 31, switch 104 would open to open the circuit between terminals 122 and 123. The low resistance circuit existing through switch 104 is then broken to increase the current in windings 50 and 85. The effect of winding 50 on relay 44 then results in members 51 and 52 moving apart to open the control switch and de-energize relay 121. At the same time, members 83 and 84 of relay 82 are opened, but since the low resistance circuit containing the switch of members 83 and 84 is already open, the operation of relay 82 has no immediate effect.

With both windings of relay 44 energized, the motor compressor will remain de-energized and even though the current overload switch 104 subsequently closes as the current in the motor compressor energization has been terminated, the low resistance circuit still remains open as relay 82 is energized. In order to restore the system to normal operation, the relay 82 as well as winding 50 of relay 44 must be de-energized. The resetting of the circuit takes place upon opening the thermostat circuit by the manual operation of switch 15 as obviously upon a call for cooling by thermostat 10, the circuit of member 13 and contact 14 would be closed. As soon as the system is de-energized, a subsequent energization will again result in the closing of relay 44 to bring about the operation of the motor compressor.

While the invention has been shown in one particular manner, the intention is to limit the scope of the invention only by the appended claims in which:

I claim:

1. In a refrigeration motor compressor control apparatus having an abnormal condition shut down circuit which can be remotely reset for normal operation, space temperature responsive switch means for providing closed circuit when the space temperature reaches a predetermined temperature, a source of power, a reed relay having a first and a second energization winding and a first switch which closes when said first winding is energized and opens when both of said windings are energized, a second reed relay having an energization winding and a second switch which is opened when said last mentioned energization winding is energized, said second switch being biased normally closed, abnormal operating condition responsive switch means having an open circuit upon the presence of an abnormal condition, circuit means including said temperature responsive switch means for connecting a parallel circuit of said first and second windings to said source, shunt circuit means connecting a circuit of said second switch and said abnormal condition switch means in parallel with said second energization winding whereby said space switch means upon closing said first switch is adapted to energize a motor compressor, circuit means connecting the energization winding of said second reed relay in parallel with said second winding whereby upon said abnormal condition switch means opening said motor compressor is de-energized until the circuit of said temperature responsive switch means is opened.

2. In a remote reset circuit for an air conditioning system, a motor compressor refrigeration apparatus adapted to affect a change in the temperature of a space, space temperature responsive switch means, first relay means having a first and a second energization winding and a first switch controlled thereby, said first switch being adapted to control the motor compressor, said relay means closing said switch where said first winding is energized and opening said switch means when said first and second windings are energized, a first impedance, circuit means including said space switch means and said first impedance for connecting said first winding to said source to energize said motor compressor when said space switch means calls for cooling, second relay means having an energization winding and a normally closed switch means, abnormal condition responsive switch means providing an open circuit upon the presence of an abnormal condition, circuit means connecting said normally closed switch means and said abnormal switch means in a series circuit, circuit means connecting said second winding of said first relay means, said winding of said second relay means and said series circuit in a parallel circuit, a second impedance means, said first impedance balancing the current level through said first and second windings, and circuit means including said space switch means and said second impedance means for connecting said parallel circuit to said source whereby said second energization winding is shunted by said series circuit and upon said abnormal switch means opening said second energization winding is energized to terminate the operation of the compressor, said normally closed switch means breaking said shunt circuit whereby normal operation after said abnormal switch means closes is restored by de-energizing said second relay means.

3. In a remote reset circuit for an air conditioning motor control system, first relay means having a first and second energization winding which are in opposition to open a first switch when said windings are both energized, said first switch being closed when only said first winding is energized, a source of power, abnormal motor operating condition switch means, a remote switch, means including said remote switch for connecting said windings in parallel to said source of power, said first switch being adapted to control a motor, a shunt circuit for normally shunting said second winding so normally operation of the motor can take place under the control of said remote switch, said shunt circuit comprising a parallel circuit of an energization winding of a second relay and a low resistance circuit of said abnormal switch and a normally closed switch of said second relay means connected in series whereby upon said abnormal switch opening said low resistance circuit is broken to allow said second energization winding of said first relay means and said second relay means to be energized, said normally closed switch maintaining said low resistance circuit open after said abnormal condition switch means closes whereby normal operation of said first switch can only exist after said remote switch is open to de-energize said second relay means to re-establish said low resistance circuit.

4. In a remote reset circuit for an air conditioning control system having a motor driven compressor, first relay means having a normally open switch and a first and a second energization windings, said switch being closed upon the energization of said first winding and adapted to energize the motor driven compressor, said switch being opened when said second winding is subsequently energized after said first winding is energized, space temperature responsive switch means, a source of power, first circuit means connecting said source to said first energization winding so that upon said space switch means closing a uni-directional current flows to close said switch, an impedance, circuit means including said impedance for connecting said second winding in parallel with said first winding, second relay means having a third energization winding and a normally closed switch, circuit means connecting said third energization winding in parallel with said second energization winding, abnormal motor operation condition switch providing a closed circuit when normal operation of the motor exists, and a shorting circuit for shorting said second energization winding and said third energization winding when normal operation exists, said shorting circuit comprising a series connection of said normally closed switch and said abnormal condition switch whereby upon the presence of an abnormal condition said shorting circuit is opened to open said normally open switch, said shorting circuit remaining open even though said abnormal condition switch closes to be only closed by the de-energization of said first and second relay means by momentarily opening said first circuit means.

5. In a remote reset circuit for an air conditioning control system having a motor driven compressor, first relay means having a normally open switch and a first and a second energization windings, said switch being closed upon the energization of said first winding, said switch being opened when said second winding is subsequently energized after said first winding is energized, space temperature responsive switch means, a source of power, first circuit means connecting said source to said first energization winding so that upon said space switch means closing a uni-directional current flows to close said switch, said switch being adapted to control the energization of the motor driven compressor, an impedance, circuit means including said impedance for connecting said second winding in parallel with said first winding, abnormal motor operation condition switch providing a closed circuit when normal operation of the motor exists, a shorting circuit for shorting said second energization winding when normal operation of said first relay means exists, said shorting circuit comprising said abnormal condition switch whereby upon the presence of an abnormal condition said shorting circuit is opened to open said normally open switch, a holding means for holding said shorting circuit open even though said abnormal condition switch closes, said holding means being de-energized by momentarily opening said first circuit means.

References Cited in the file of this patent
UNITED STATES PATENTS

| | | |
|---|---|---|
| 2,203,321 | Bascom | June 4, 1940 |
| 2,377,503 | Kronmiller | June 5, 1945 |
| 2,884,767 | Ritter et al. | May 5, 1959 |
| 2,891,386 | Winter | June 23, 1959 |
| 2,955,435 | Willette | Oct. 11, 1960 |
| 3,022,641 | Myck et al. | Feb. 27, 1962 |
| 3,065,381 | Kyle | Nov. 20, 1962 |